United States Patent [19]
Ray

[11] 3,739,856
[45] June 19, 1973

[54] AERATOR TYPE ATTACHMENT STRUCTURE

[76] Inventor: Charles A. Ray, 1629 Moyle, Augusta, Kans.

[22] Filed: Dec. 9, 1971

[21] Appl. No.: 206,302

[52] U.S. Cl. ............... 172/21, 172/120, 172/532, 172/766, 256/56, 172/536
[51] Int. Cl. ............................................. A01b 45/02
[58] Field of Search ............... 56/256; 172/21, 22, 172/42, 60, 118, 119–120, 123, 536, 532, 765, 766; 37/43 R, 43 E

[56] References Cited
UNITED STATES PATENTS

| | | | |
|---|---|---|---|
| 1,742,563 | 1/1930 | Stidger | 172/119 |
| 2,864,294 | 12/1958 | Pearson | 172/42 |
| 922,405 | 8/1909 | Dreyer | 172/536 |
| 1,149,992 | 8/1915 | Brennan | 172/536 |
| 2,856,832 | 10/1958 | Galazin | 172/21 |
| 3,171,498 | 3/1965 | Logan | 172/22 |

FOREIGN PATENTS OR APPLICATIONS

| | | | |
|---|---|---|---|
| 465,297 | 12/1968 | Switzerland | 172/119 |
| 883,824 | 12/1961 | Great Britain | 172/42 |
| 256,472 | 5/1963 | Australia | 172/21 |
| 296,577 | 5/1954 | Switzerland | 172/120 |

*Primary Examiner*—Robert E. Pulfrey
*Assistant Examiner*—Eugene H. Elckholt
*Attorney*—Phillip A. Rein

[57] ABSTRACT

This invention is an aerator type attachment structure which may be connected to a power means such as a garden tractor having a pair of aerator assemblies rotatable on contact with the area being worked. More particularly, each of the aerator assemblies are composed of a main support shaft having a plurality of spaced and angularly positioned parallel plate members thereupon, each plate member of a square shape to engage the earth for aerating and support purposes on rotation of the support shaft. Each aerator assembly includes an adjustable depth control assembly to adjust the depth of the blade working with the supporting earth.

3 Claims, 5 Drawing Figures

PATENTED JUN 19 1973 3,739,856

INVENTOR.
CHARLES A. RAY
BY
Phillip A. Rein
ATTORNEY

AERATOR TYPE ATTACHMENT STRUCTURE

Numerous types of cultivator or aerator structures are known in the prior art having a plurality of sharp blade members engagable with the soil to be worked thereon but such structures are provided with blade members which acts to cut the grass and grass roots instead of gently pulling same as achieved by the applicant's invention. Additionally, the blade structures of the prior art aerator structures are generally of an inclined angle with its support shaft which does not achieve the new and novel pulling result of the applicant's invention. Furthermore, the prior art devices are expensive to manufacture and require considerable maintenance to keep in satisfactory working order.

In one particular embodiment of this invention, an aerator structure is provided which is readily attachable to a power means such as a garden tractor structure or the like for rotation thereof. The aerator structure is provided with a pair of substantially identical aerator assemblies, each of which is attached to an opposite side of a common drive shaft for rotation thereof. More particularly, each aerator assembly includes a main elongated support shaft having a plurality of spaced parallel plate members secured thereto and having a depth control assembly mounted between central plate members. More particularly, the main support shaft has one end provided with a coupling means for attachment to the drive shaft from the garden tractor or other such driving means. The plate members are secured as by welding so as to be perpendicular to the axis of the support shaft and spaced thereon, for example, 1 inch apart. Additionally, if taken from an end view, it is seen that adjacent ones of the plate members are offset a certain angular rotation so as to give a spiral effect and to assure that a plurality of sections of the plate members are always in contact with the support earth. Each plate member is of a square shape having its outer respective corners formed with hardened corner areas to increase life thereof. It is noted that the outer hardened corner areas do not present a knife structure but rather a blunt corner structure which achieves the efficient action of this invention. The depth control assembly includes a circular, overlapping band member having a plurality of inwardly extending support members having holes therewithin to receive an anchoring bolt and nut assembly. It is to be noted that the depth control assembly and, more specifically, the spring tension band member can be moved inwardly and outwardly and anchored by the bolt and nut assembly so as to regulate the overall depth that the respective aerator assembly reaches within the earth on which it is being utilized.

One object of this invention is to provide an aerator structure overcoming the aforementioned disadvantages of the prior art structures.

One further object of this invention is to provide an aerator structure which may readily attach to a conventional power means such as a garden tractor so as to rotate the same in contact with the earth being worked and having a plurality of spaced plate members to achieve support along its entire length.

Still, one further object of this invention is to provide an aerator assembly having an elongated shaft with a plurality of parallel blade members secured thereto in a staggered relationship for desired support and having hardened corner areas for each of the square plate members so as to achieve a pulling action with the grass being worked upon for the most efficient and effective results.

Another object of this invention is to provide an aerator assembly having a plurality of staggered square plate members for working of the earth and having a depth control assembly with a spring tension band so as to adjustably regulate the working depth of the aerator structure in contact with the earth.

One further object of this invention is to provide an aerator assembly which is simple and easy to manufacture, substantaily maintenance free, simple in operation, and provides for efficient and effective working of the earth and grass for aerating purposes.

Various other objects, advantages, and features of the invention will become apparent to those skilled in the art from the following discussion, taken in conjunction with the accompanying drawings, in which.

Figure 1:
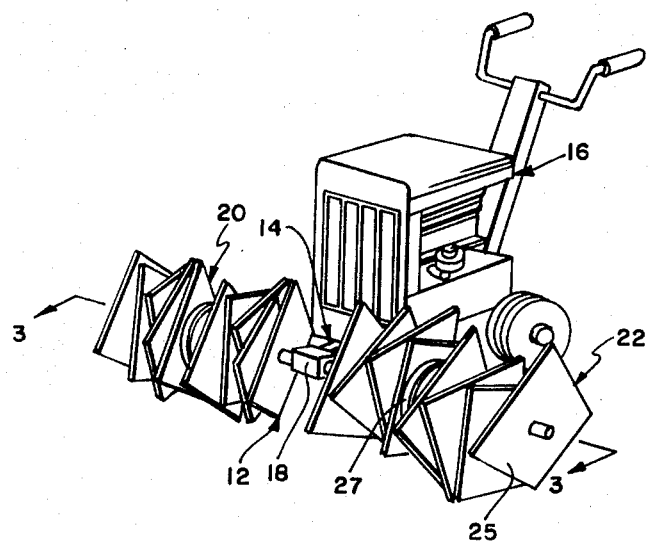
FIG. 1 is a persepctive view of a garden tractor having the aerator structure of this invention attached thereto.

The following is a discussion and description of preferred specific embodiments of the new aerator structure of this invention, such being made with reference to the drawings whereupon the same reference numerals are used to indicate the same and/or similar structures. It is to be understood that such discussion and description is not to unduly limit the scope of the invention.

Referring to the drawings in detail, and, more particularly to FIG. 1, an aerator structure of this invention, indicated generally at 12, is shown as attached to a power output assembly 14 of a garden tractor structure 16. It is seen that the aerator structure 12 is attached to a connector means 18 of the power output assembly 14 in order to provide for rotation thereof. However, it is understood that numerous types of power equipment such as large tractors, etc., can be utilized to provide the driving force therefore.

Figure 3:
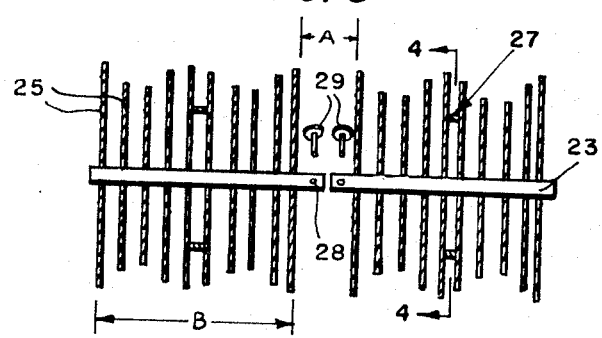
FIG. 3 is a sectional view taken along line 3—3 in FIG. 1 having the aerator structure rotated 45° from the view in FIG. 1.

More particularly, as shown in FIG. 3, the aerator structure 12 consists of a pair of aerator assemblies 20 and 22 attached to opposite sides of the connector means 18. In this case, it is noted that the spacing between the inner portions of the aerator assemblies 20 and 22, as shown by "A," is substantially equal to that of the width of the respective ones of the aerator assemblies 20 and 22, as shown at "B," so that the operator may move over while using the aerator structure 12 so as to completely aerate the yard with the use of the garden tractor structure 16.

As the aerator assemblies 20 and 22 are substantially identical in structure except for direction of spiral as will be explained, only one need be described in detail. The aerator assembly 20 includes a main support shaft 23 having a plurality of spaced plate members 25 secured perpendicular to the axis of the support shaft 23 and having a depth control assembly 27 thereon. The main support shaft 23 is of a rigid construction having a connnection at an inner end being a hole 28 to receive a locking pin 29 therethrough for anchoring to the connector means 18 of the garden tractor structure 16.

A plurality of the plate members 25 are secured preferably as by welding at each center thereof to the main support shaft 23 and spaced equally therealong. In this embodiment, each of the aerator assemblies 20 and 22 is shown as provided with 10 of the plate members 25 having the depth control assembly 27 mounted between the central ones thereof.

Figure 2:
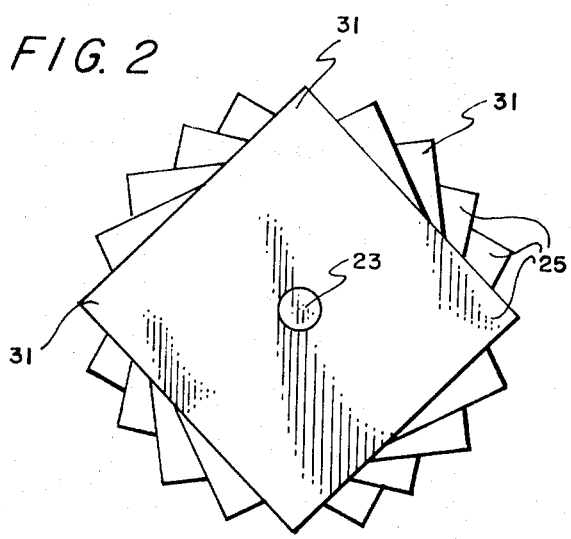
FIG. 2 is an enlarged, end view of the aerator structure of this invention.

More particularly, as shown in FIG. 2, it is seen that the plate members 25 are each of a square shape and having successive ones rotated about 18° from the adjacent ones so as to achieve the generally spiral effect, as shown in FIG. 2, which provides forty separate support areas. Each plate member 25 is preferably constructed of rigid steel from three thirty-seconds to a one-fourth inch thick and having the outer corners 31 provided with hardened areas. The hardened corner areas 31 achieves additional longevity of the puller edge while working the earth because of foreign objects such as rocks, etc,. that might be encountered causing wear upon the plate members 25. However, the hardened outer corner area 31 is a square corner area not provided with a sharp blade structure for reasons to be explained more fully in detail herein.

Figure 5:
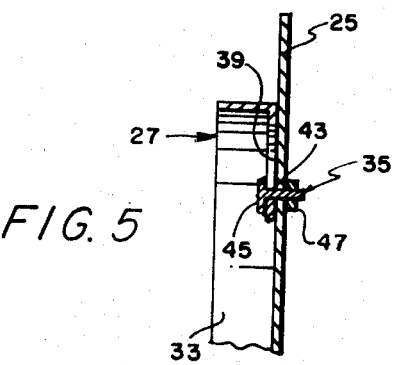
FIG. 5 is an enlarged, fragmentary, sectional view taken along line 5—5 in FIG. 4.
Figure 4:
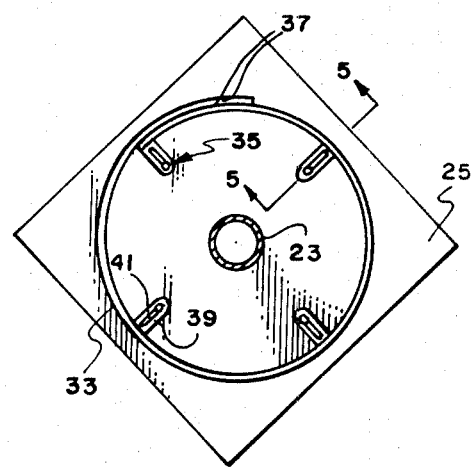
FIG. 4 is an enlarged, sectional view taken along line 4—4 in FIG. 3.

As shown in FIGS. 4 and 5, the depth control assembly 27 is provided with a main spring tension band 33 secured by adjustment anchor nut and bolt assemblies 35 at four equally spaced positions thereabout. More particularly, the tension band member 33 is shown to be overlapping as shown by the adjacent ends 37 whereupon the same can be readily moved inwardly and outwardly as being supported on inwardly projected support elements 39, each having a slot 41 therewithin to receive the adjustment anchor nut and bolt assemblies 35. The nut and bolt assemblies 35 are operable to securely clamp the support elements 39 to the central plate member 25 (FIG. 4) in an adjusted position. It is seen that the same can be moved inwardly from the position as shown in FIG. 4 to increase the working depth of the overall aerator structure 12 where desired. Each anchor nut and bolt assembly 35 includes a bolt member 43 provided with a square head section 45 to fit within the respective slots 41 to prevent its rotation when tightening a nut member 47 thereon.

It is to be noted that the aerator structure 12 has been described wherein the components being the aerator assemblies 20 and 22 are readily attached to the power output assembly 14 on the garden tractor structure 16 for rotation therewith. It is seen that the staggered relationship of the plurality of plate members 25 provides the desired and required support over the entire length of the respective aerator assemblies 20 and 22. Each plate member 25 has the outer square corner areas 31 so that the same does not cut but achieves a pulling action with the earth and, more particularly, pulls the grass and its roots for aeration purposes instead of cutting or slicing the same and such achieves a new and novel result of this invention. The depth control assembly 27 is very desirable in achieving control of working depths on the grass being aerated by this invention.

As shown in FIGS. 1 and 3, each aerator assembly 20 and 22 is formed with two identical sets of plate members 25 so that, on counter clockwise rotation of the support shaft 23 as viewed on the right side of FIG. 1, the individual corner areas 31 of the plate members 25 contact the earth in a spiral action. This sprial action moves from the center outwardly in two identical paths on each side so that each aerator assembly 20 and 22 is supported at two points at all times during rotation. This spiral action provides the necessary support and achieves the unigue aerating action of this invention.

Additionally, the aerator structure of this invention utilizes aerator assemblies which are simple in construction being economical to manufacture, substantially maintenance free, easy to attach and detach from a power structure, being self cleaning, and rigid in construction. It is noted that the blade members could be fastened on the support shaft in a manner so that they could be replaced when worn out or removed for maintenance.

While the invention has been described in conjunction with preferred specific embodiments, it is to be understood that this description and discussion is intended to illustrate and not to limit the scope of the invention, which is defined by the following claims.

I claim:

1. An aerator structure adapted to be attached to the power takeoff means of a garden tractor or the like, comprising:
   a. an aerator assembly having a plurality of spaced plate members secured to an elongated support shaft so as to extend perpendicular to the axis of said support shaft,
   b. said plate members each having more than one corner areas thereon,
   c. means for connecting said support shaft to said power takeoff of the garden tractor,
   d. said plate members being secured in a spiral manner to said support shaft so that on rotation of said support shaft in one direction said corner areas of said plate members contact the support surface in an outward directional spiral,
   e. said plate members each having a plurality of said corner areas to contact the support surface being worked upon in a spiraling action, each of said corner areas forming an apex of 90° to form a blunt, non cutting form of said corner areas, and
   f. said plate members each having said corner areas hardened so as to contact and pull grass in the support surface being aerated without cutting the same.

2. An aerator structure as described in claim 1, wherein:
   a. said aerator assembly having more than one identical set in spaced rotation of said plate members secured to said support shaft, and
   b. each of said sets of said plate members having a corner area contacting the support surface in the outward direction spiral and contacting the support surface in a continuous sprial directed outwardly in each of said set of said plate members.

3. An aerator structure as described in claim 1, wherein:
   a. said corner areas contacting the support surface on a continuous, outwardly spiraling movement relative to the center of said support shaft.

* * * * *